US005313153A

United States Patent [19]

Locher et al.

[11] Patent Number: 5,313,153

[45] Date of Patent: May 17, 1994

[54] CIRCUIT ARRANGEMENT FOR CYCLIC SUPPLY

[75] Inventors: Johannes Locher, Stuttgart; Werner Fischer, Ditzingen; Joachim Tauscher, Stuttgart, all of Fed. Rep. of Germany

[73] Assignee: Robert Bosch GmbH, Stuttgart, Fed. Rep. of Germany

[21] Appl. No.: 566,366

[22] PCT Filed: Dec. 30, 1988

[86] PCT No.: PCT/DE88/00786

§ 371 Date: Sep. 6, 1990

§ 102(e) Date: Sep. 6, 1990

[87] PCT Pub. No.: WO89/07831

PCT Pub. Date: Aug. 24, 1989

[30] Foreign Application Priority Data

Feb. 18, 1988 [DE] Fed. Rep. of Germany ....... 3805031

[51] Int. Cl.$^5$ ....................... G05B 11/00; G05F 1/613

[52] U.S. Cl. .................................... 323/284; 323/222; 361/152; 361/154

[58] Field of Search ............... 323/222, 282, 284, 285, 323/288; 361/152, 153, 154, 170, 187; G05F 1/613

[56] References Cited

U.S. PATENT DOCUMENTS

Re. 33,285 7/1990 Kunen ................................ 307/116
3,796,942 3/1974 Bynum .................................... 321/6
3,973,545 8/1976 Fischman et al. ............ 123/148 CB
4,271,812 6/1981 Bodig et al. ......................... 123/609
4,357,572 11/1982 Andersen et al. .................... 323/286
4,397,290 8/1983 Tanaka et al. ....................... 123/618
4,446,410 5/1984 Yagura et al. ....................... 361/152
4,503,480 3/1985 Pickard et al. ....................... 361/152
4,523,251 6/1985 Erdmann et al. .................... 361/152
4,544,986 10/1985 Büchl ...................................... 361/152
4,978,865 12/1990 Hartmann et al. .................. 307/140
5,014,675 5/1991 Koiwa ................................. 123/609
5,109,827 5/1992 Nobe et al. .......................... 123/618

FOREIGN PATENT DOCUMENTS 0075303 3/1983 European Pat. Off. .
2425585 2/1975 Fed. Rep. of Germany .
3320110 12/1984 Fed. Rep. of Germany .......... H01F 7/18
57-157878 9/1982 Japan .
2127186 4/1984 United Kingdom .

*Primary Examiner*—Steven L. Stephan
*Assistant Examiner*—Ben Davidson
*Attorney, Agent, or Firm*—Kenyon & Kenyon

[57] ABSTRACT

A synchronizing current regulator whose clock frequency is able to be readjusted is provided in the case of a circuit configuration for the synchronized supply of an electromagnetic user with regulation which is acted upon by a control signal representing the difference between the instantaneous signal at the user and a predeterminable reference signal.

5 Claims, 3 Drawing Sheets

CIRCUIT ARRANGEMENT FOR CYCLIC SUPPLY

PRIOR ART

The invention relates to a circuit configuration for the synchronized supply of an electromagnetic user with regulation which is acted upon by a control signal representing the difference between the instantaneous signal at the user and a predeterminable reference signal. This type of a circuit configuration is known e.g. from the U.S. Pat. No. 4,452,210 and comprises a driver circuit for an injection valve of an internal-combustion engine. In the case of the known driver circuit, the field current is determined while the injection valve is open and a signal is derived from this. A control signal, which serves as the basis of a pulse-duration-modifying signal, is generated from the difference between this instantaneous signal and a predeterminable reference signal. The field current for the injection valve is therefore controlled by influencing the pulse duration of the field current signal and is thus modulated according to pulse duration.

However, this type of regulation with the aid of pulse duration modulation has the result that, due to the changing duration of the electric power pulses for the field current of the injection valve during the regulating process, harmonic waves occur.

ADVANTAGES OF THE INVENTION

The circuit configuration according to the invention for the synchronized supply of an electromagnetic user with regulation which is acted upon by a control signal representing the difference between the instantaneous signal at the user and a predeterminable reference signal, whereby a synchronized current regulator is provided whose clock frequency is able to be readjusted, has in regulator are available, namely a compensation for the counter electromotive force of the electromagnetic user and an idle time of zero for a step response. According to the invention, these advantages are combined with the advantageous property that a fixed, constant frequency for clocking is achieved in the stationary state.

In order to readjust the clock frequency, preferably a circuit element is provided which has a frequency/voltage transformer with an integrator which is located downstream. Noises in the clock frequency can be effectively squelched as a result of integration, since the integration signal does not change considerably when additional noise pulses are present at the clock frequency. A comparator is preferably provided to perfect the frequency/voltage transformer.

To couple the circuit element to the current regulator for the readjustment procedure, a circuit breaker, whose control signal is able to be supplied to the circuit element, is advantageously provided which is preferably assigned to and acts upon the user. Furthermore, a trigger circuit, whose hysteresis is able to be changed by the circuit element, is provided to control the circuit breaker.

For this purpose, the trigger circuit is advantageously designed as a Schmitt trigger. A Schmitt trigger has a hysteresis which is usually determined by the corresponding wiring configuration of the Schmitt trigger and can be changed by another wiring configuration if indicated. Therefore, according to the invention, the current hysteresis of the current regulator is adaptable to various circumstances by means of the wiring configuration of the Schmitt trigger.

In the case of a particularly advantageous development of the circuit according to the invention, an additional control input is provided to which a voltage is able to be applied to control the current hysteresis of the current regulator. Therefore, in this specific embodiment, an adjustable voltage is used instead of a voltage for the Schmitt trigger which has been set by means of fixed wiring configuration.

DRAWING

The invention is more closely explained in the following in light of an illustrated, preferred exemplified embodiment from which proceed further advantages and features.

DESCRIPTION OF THE EXEMPLIFIED EMBODIMENT

The exemplified embodiment concerns a current-regulating circuit whereby a readjustment of the clock frequency takes place using a special circuit element, whereby a user (load) is supplied via a circuit breaker. For example, the load can comprise an inductor, i.e. a field coil for a fuel injection valve of an internal-combustion engine.

Figure 1:
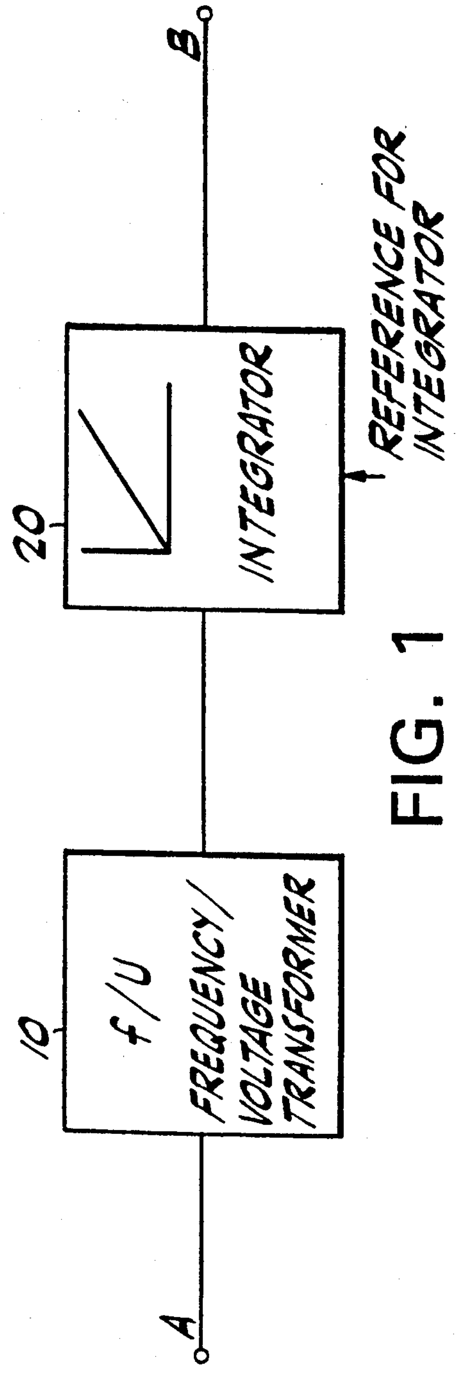
FIG. 1 shows a greatly simplified, schematic block diagram to illustrate the principle of the readjustment procedure according to the invention.
Figure 2:
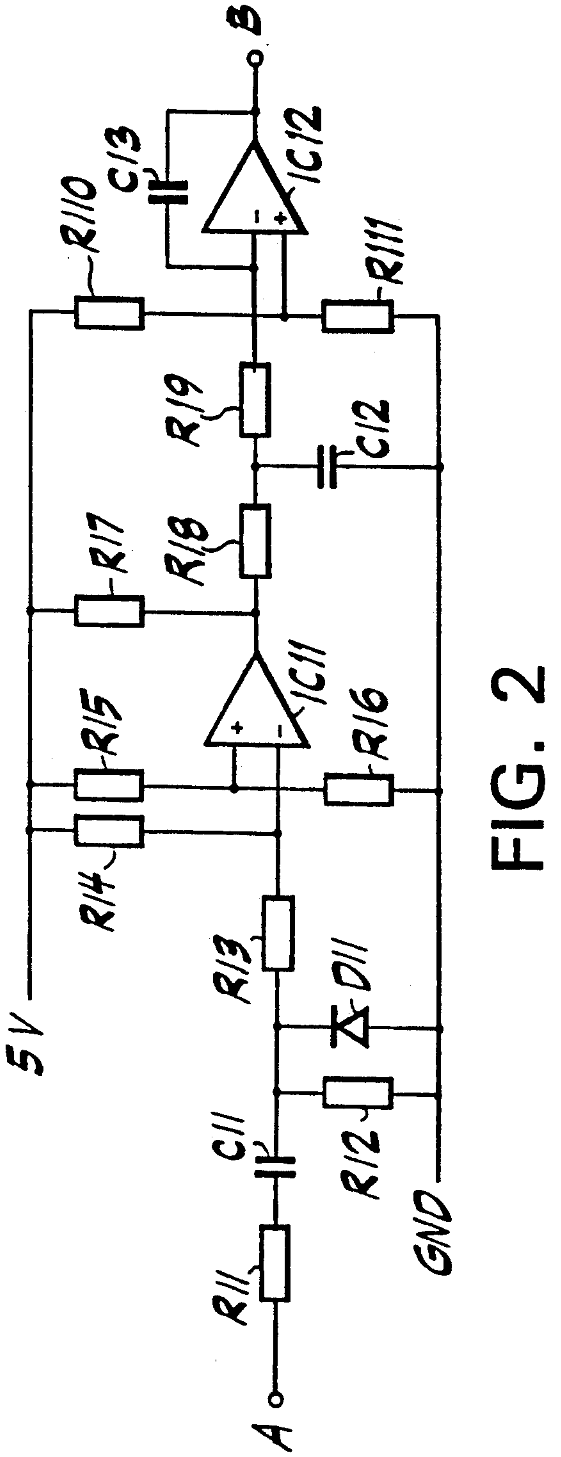
FIG. 2 shows a preferred exemplified embodiment of a circuit element according to the invention for readjusting the clock frequency.
Figure 4:
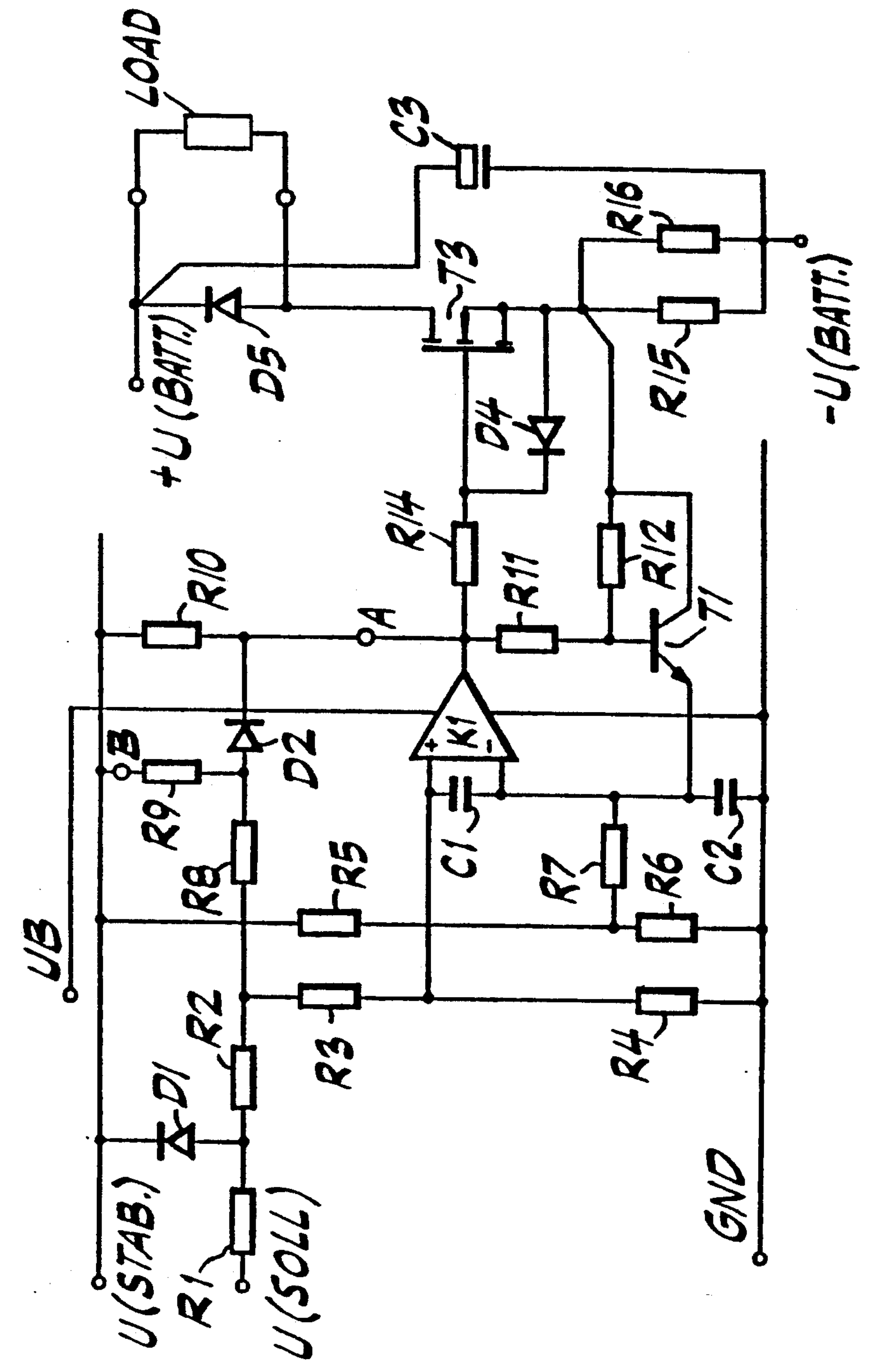
FIG. 4 shows an exemplified embodiment of a current regulator according to the invention.

The circuit element with the connecting points A and B, which is shown in a greatly simplified version in FIG. 1 and in a preferred exemplified embodiment in FIG. 2, is provided for the purpose of being inserted between the points also designated A and B in a specific embodiment of a current regulator according to the invention which is shown in detail in FIG. 4.

As follows from the FIGS. 1 and 2, the circuit element comprises a frequency/voltage transformer 10 which is connected to a terminal A and to which an integrator 20 is connected downstream, and which is followed by an output terminal B.

In the case of the circuit element shown in FIG. 2, the input terminal A and the output terminal B correspond to the corresponding terminals of the block diagram according to FIG. 1. A resistor R11 and a capacitor C11 are serially connected to the input terminal A, which is connected to a resistor R13, a resistor R12 as well as the cathode of a diode D11. The other respective connections of the resistor R12 i.e. the diode D11 are connected to ground (GND). The other end of the resistor R13 is connected to the negative input of a comparator IC11 as well as to a resistor R14, whose other end contacts a supply voltage (5 volts). The comparator IC11 is designed as a so-called "open collector".

The other, positive input of the comparator IC11 is connected to the supply voltage (5 volts) via a resistor R15 and to ground via a resistor R 16. The output of the comparator IC11 feeds back to the supply voltage via a resistor R17 and is further connected to a resistor R18, whose other end is connected to a resistor R19 and to a capacitor C12, whose other terminal is connected to ground. The other end of the resistor R19 is attached to the negative input of an operational amplifier IC12, whose output is connected to the output terminal B of the circuit element. The negative input and the output of the operational amplifier IC12 are connected by way of an integrational capacitor C13. A resistor R110, which leads to the supply voltage, and a resistor R111, whose other terminal is connected to ground, contact the positive input of the operational amplifier IC12.

Figure 3:
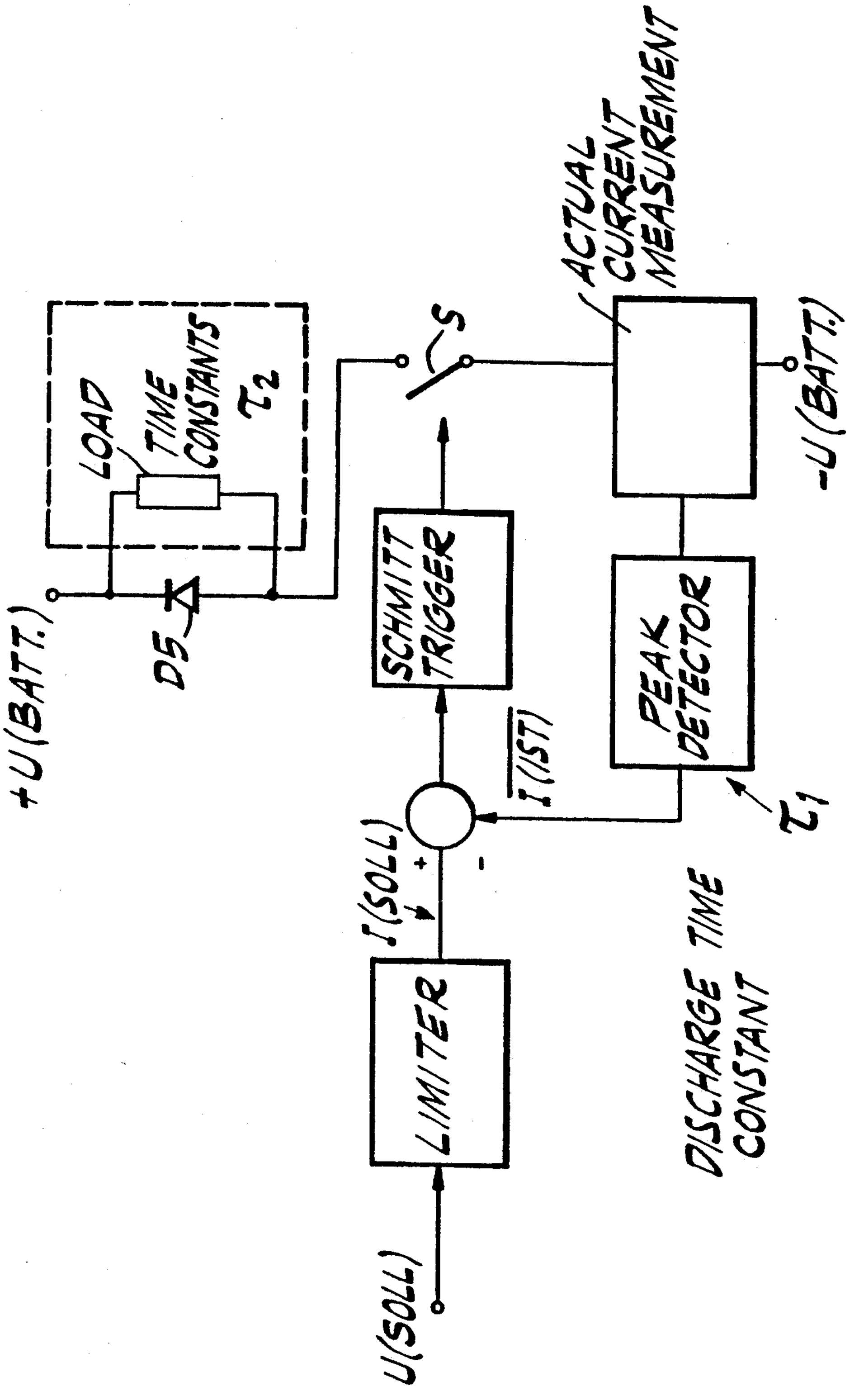
FIG. 3 shows a block diagram of a current regulator according to the invention.

FIG. 3 of the drawing shows a schematic block diagram of a current regulating circuit according to the invention, which is shown in detail in FIG. 4 in a preferred exemplified embodiment. In the block diagram according to FIG. 3, a test voltage U(Soll), which is in proportion to the test current at an inductive load, is applied to the input. The test voltage is supplied to the positive input of a comparator via a delimiter, to which a voltage is applied which is in proportion to the test current I(Soll), and to whose negative input a mean actual voltage variable is applied which is in proportion to the mean actual current I(Ist).

The output signal of the comparator is transmitted to a Schmitt trigger which controls an electronic circuit breaker S. An inductive load is controlled by the circuit breaker S at the rate of the pulses emitted by the Schmitt trigger, whose one terminal contacts the breaker S and whose other terminal leads to a positive supply voltage +U(Batt.). The load is connected by way of a diode D5.

The other terminal of the circuit breaker S leads to a device for measuring the actual current, which in turn contacts a negative supply voltage −U(Batt.).

The signal emitted by the actual current measuring device is supplied to a peak detector which has a discharge time constant $\gamma_1$. The peak detector therefore emits a mean actual current signal I(Ist) which, as already mentioned, is supplied to the negative input of the comparator.

The current regulating circuit according to the invention which is explained in light of the block diagram of FIG. 3 shall be more closely explained in the following in light of the preferred specific embodiment according to FIG. 4.

The test voltage U(Soll) is supplied to the positive input + of a comparator K1 via resistors R1, R2, and R3, which are serially connected in a voltage grading circuit to a resistor R4, whose other terminal is connected to ground. Also, the anode of a diode D1, whose cathode is attached to a stabilized reference voltage U(stab.), is connected between the resistors R1 and R2.

Also connected to the stabilized voltage U(stab.) is a resistor R5, which is connected to two resistors R7 and R6. The other terminal of the resistor R6 is connected to ground; the other terminal of the resistor R7 is connected to the negative input of the comparator K1 and to one of the two inputs of the comparator, which are connected by way of the capacitor C1. In addition, a capacitor C2 is located between the negative input—of the comparator K1 and ground.

A lead runs from the interconnection point of the resistors R2 and R3 to a resistor R8, whose other terminal is connected to a resistor R9 and to the anode of a diode D2. The other terminal of the resistor R9 leads to the stabilized supply voltage U(stab.) via a connecting point B, which was already discussed in light of FIGS. 1 and 2.

The cathode of the diode D2 is connected to a resistor R10, and the resistor R10 is in turn connected to the stabilized supply voltage. Furthermore, the cathode-sided terminal of the diode D2 is connected to the output of the comparator K1 via a connecting point A, which has already been explained in light of the FIGS. 1 and 2.

The circuit element for readjusting the clock frequency, which has been explained in light of the FIGS. 1 and 2, along with its connecting points A, B, is therefore attached to the corresponding connecting points A, B of the current regulator of the invention according to FIG. 4.

The output of the comparator K1 is connected to a terminal of a resistor R11, whose other terminal is connected to the base of a transistor T1, whose base and collector terminals are connected by a resistor R12 and whose emitter terminal leads to the negative input of the comparator K1.

Also leading to the output of the comparator or to the connecting point A is a resistor R14, whose terminal is connected to the gate terminal of a field effect power transistor T3. The source terminal of the transistor T3 is connected to the anode of a diode D4, whose cathode is connected to the gate terminal, and also to the interconnection point between the resistor R12 and the collector of the transistor T1 as well as to an interconnection point of the resistors R15, R16. The other respective terminals of the resistors R15, R16 are connected together and are attached to the negative supply voltage −U(batt.).

The drain terminal of the transistor T3 is connected to a load inductor whose other terminal contacts the positive supply voltage +U(batt.), and which is connected via a diode D5, whose anode is connected to the drain terminal of the transistor T3.

The control terminal B for the circuit element shown in FIGS. 1 and 2 is directly connected to the stabilized voltage U(stab.) in the specific embodiment shown in FIG. 4. The Schmitt trigger therefore operates with a fixed hysteresis, which is determined by the resistors which are connected downstream from the connecting point B.

In comparison, if the connection between the connecting point B and the stabilized supply voltage U(stab.) is severed, then an adjustable control voltage can be applied to the connecting point B, which then adjustably stipulates the hysteresis of the Schmitt trigger and thereby the current hysteresis of the entire current regulator.

We claim:

1. A control circuit for controlling an electromagnetic load in accordance with an input signal, the control circuit comprising:

a frequency/voltrage transformer for receiving a control signal of a given frequency;

an integrator, an input of the integrator being coupled to an output of the frequency/voltage transformer and an output signal of the integrator being indicative of the deviation of the frequency of the control signal from a predetermined value;

comparison means, a first input of the comparison means receiving a first current signal indicative of a current through the load, a second input of the comparison means receiving the input signal, the comparison means generating the control signal in accordance with the comparison of the first current signal and the input signal, and the comparison means having a hysteresis which can be altered as a function of the output signal of the integrator so that the control signal has a frequency that corresponds substantially to the predetermined value; and a switching device coupled to the electromagnetic load and controlled by the control signal, thereby controlling the electromagnetic load.

2. The control circuit according to claim 1, wherein the comparison means includes a comparator.

3. The control circuit according to cliam 1, wherein the comparison means includes a trigger device.

4. The control circuit according to cliam 3, wherein the trigger device includes a Schmitt trigger.

5. The control circuit according to claim 1, wherein the frequency/voltage transformer includes a comparator.

* * * * *

UNITED STATES PATENT AND TRADEMARK OFFICE

CERTIFICATE OF CORRECTION

PATENT NO. : 5,313,153

DATED : May 17, 1994

INVENTOR(S) : Locher, et al.

It is certified that error appears in the above-indentified patent and that said Letters Patent is hereby corrected as shown below:

In column 1, line 38, change "in regulator" to -- in particular the advantage that the basic advantages of a current regulator --;

In column 3, line 35, change "$\gamma 1$." to $\tau 1$. --.

Signed and Sealed this

Fourth Day of April, 1995

Attest:

BRUCE LEHMAN

*Attesting Officer* *Commissioner of Patents and Trademarks*